US011287885B1

(12) United States Patent
Kienzle et al.

(10) Patent No.: US 11,287,885 B1
(45) Date of Patent: Mar. 29, 2022

(54) APPARATUS, SYSTEM, AND METHOD FOR DETERMINING THE POSITION OF WEARABLES DONNED BY USERS OF ARTIFICIAL REALITY SYSTEMS

(71) Applicant: Facebook Technologies, LLC, Menlo Park, CA (US)

(72) Inventors: Wolf Kienzle, Seattle, WA (US); Hrvoje Benko, Seattle, WA (US); Joseph Davis Greer, Portland, OR (US); Tristan Thomas Trutna, Portland, OR (US); Raymond King, Woodinville, WA (US); Yanjun Ma, Oro Valley, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 46 days.

(21) Appl. No.: 16/254,368

(22) Filed: Jan. 22, 2019

(51) Int. Cl.
| | | |
|---|---|---|
| *G06F 3/01* | (2006.01) | |
| *G06T 19/20* | (2011.01) | |
| *G01L 1/22* | (2006.01) | |
| *G06T 19/00* | (2011.01) | |
| *G02B 27/01* | (2006.01) | |
| *H04N 5/33* | (2006.01) | |

(52) U.S. Cl.
CPC ............... *G06F 3/014* (2013.01); *G01L 1/22* (2013.01); *G02B 27/0172* (2013.01); *G06F 3/017* (2013.01); *G06T 19/006* (2013.01); *G06T 19/20* (2013.01); *H04N 5/33* (2013.01); *G02B 2027/0138* (2013.01)

(58) Field of Classification Search
None
See application file for complete search history.

(56) References Cited

U.S. PATENT DOCUMENTS

| 5,592,401 A | * | 1/1997 | Kramer | .............. | A63B 69/3608 |
| | | | | | 340/524 |
| 10,705,606 B1 | * | 7/2020 | Colonnese | ......... | G02B 27/0172 |
| | | | (Continued) | | |

FOREIGN PATENT DOCUMENTS

WO   WO-2017202309 A1 * 11/2017  ............. G03B 21/30

OTHER PUBLICATIONS

Silva et al., "Sensor Data Fusion for Full Arm Tracking Using Myo Armband and Leap Motion," Nov. 11-13, 2015, 14th Brazilian Symposium on Computer Games and Digital Entertainment, https://ieeexplore.ieee.org/document/7785849.*

(Continued)

*Primary Examiner* — Ryan Barrett
(74) *Attorney, Agent, or Firm* — FisherBroyles, LLP

(57) ABSTRACT

An apparatus for determining the position of artificial reality wearables may include a wearable dimensioned to be donned by a user of an artificial reality system. The apparatus may also include a sensor incorporated into the wearable. The sensor may detect physical interactions between the wearable and at least one specific body part of the user. The apparatus may further include a processing device communicatively coupled to the sensor. The processing device may determine, based at least in part on one or more physical interactions between the wearable and the specific body part of the user, a change in a position of the wearable relative to the specific body part of the user. Various other apparatuses, systems, and methods are also disclosed.

20 Claims, 10 Drawing Sheets

(56) References Cited

U.S. PATENT DOCUMENTS

| | | | | |
|---|---|---|---|---|
| 10,765,357 | B2* | 9/2020 | Wu | A61B 5/7282 |
| 10,845,212 | B1* | 11/2020 | Turkyilmaz | G06F 3/014 |
| 10,928,889 | B1* | 2/2021 | Whitmire | G01S 7/52004 |
| 2004/0246338 | A1* | 12/2004 | Lieberman | G06F 1/163 |
| | | | | 348/207.1 |
| 2014/0028546 | A1* | 1/2014 | Jeon | G06F 3/04842 |
| | | | | 345/156 |
| 2015/0054730 | A1* | 2/2015 | Kodama | G06F 1/1639 |
| | | | | 345/156 |
| 2015/0061842 | A1* | 3/2015 | Yoon | G06F 3/017 |
| | | | | 340/12.5 |
| 2015/0077324 | A1* | 3/2015 | Birnbaum | G06F 3/016 |
| | | | | 345/156 |
| 2015/0234454 | A1* | 8/2015 | Kurz | G06T 19/006 |
| | | | | 345/156 |
| 2016/0179199 | A1* | 6/2016 | Levesque | G06F 3/014 |
| | | | | 340/407.2 |
| 2016/0363997 | A1* | 12/2016 | Black | G06F 3/016 |
| 2017/0038832 | A1* | 2/2017 | Du | G01S 15/04 |
| 2017/0055938 | A1* | 3/2017 | Krasnow | A61B 5/681 |
| 2017/0123487 | A1* | 5/2017 | Hazra | G06F 3/017 |
| 2017/0172424 | A1* | 6/2017 | Eggers | A61B 5/681 |
| 2017/0251926 | A1* | 9/2017 | Yoon | A61B 5/02125 |
| 2017/0262045 | A1* | 9/2017 | Rouvinez | G06F 3/011 |
| 2017/0307891 | A1* | 10/2017 | Bucknor | G01S 1/68 |
| 2018/0018014 | A1* | 1/2018 | Lutnick | G06F 3/011 |
| 2018/0161671 | A1* | 6/2018 | Heubel | A63F 13/212 |
| 2018/0348880 | A1* | 12/2018 | Juliato | A61B 5/4519 |
| 2019/0212825 | A1* | 7/2019 | Simmons | G06F 3/0346 |
| 2019/0290202 | A1* | 9/2019 | Di Pardo | G06F 3/014 |
| 2020/0026352 | A1* | 1/2020 | Wang | G06F 3/011 |
| 2020/0027275 | A1* | 1/2020 | Wan | G06F 3/016 |
| 2021/0045687 | A1* | 2/2021 | Wiese | A61B 5/14552 |

OTHER PUBLICATIONS

Samuel et al., "An organic optoelectronic muscle contraction sensor for prosthetics," Apr. 20, 2015, https://spie.org/news/5812-an-organic-optoelectronic-muscle-contraction-sensor-for-prosthetics.*

Sikora et al., "Muscle activity measurement using visible light and infrared ," IFAC—PapersOnLine vol. 52, Issue 27, 2019, pp. 329-334, https://www.sciencedirect.com/science/article/pii/S240589631932631X.*

Wikipedia, "Kalman filter", URL: https://en.wikipedia.org/wiki/Kalman_filter, 20 pages.

Wikipedia, "Strain gauge", URL: https://en.wikipedia.org/wiki/Strain_gauge, 2018, 7 pages.

Whitmire et al., "Apparatus, System, and Method for Directional Acoustic Sensing Via Wearables Donned by Users of Artificial Reality Systems", U.S. Appl. No. 16/254,370, filed Jan. 22, 2019, 71 pages.

* cited by examiner

APPARATUS, SYSTEM, AND METHOD FOR DETERMINING THE POSITION OF WEARABLES DONNED BY USERS OF ARTIFICIAL REALITY SYSTEMS

BACKGROUND

Artificial reality often provides a rich, immersive experience in which users are able to interact with virtual objects and/or environments in one way or another. In this context, artificial reality may constitute a form of reality that has been altered by virtual objects for presentation to a user. Such artificial reality may include and/or represent virtual reality (VR), augmented reality (AR), mixed reality (MR), hybrid reality, or some combination and/or variation of one or more of the same. Although artificial reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate interpersonal interactions and collaboration from across the globe.

An artificial reality system may include one or more types of wearable devices, such as a head-mounted display, a wristband, and/or a neckband. Such devices may provide various types of content (including videos and haptic feedback) to facilitate a realistic and immersive artificial reality experience. As an example, a wristband donned by a user of an artificial reality system may project an image (such as a clock or a touchpad) onto the user's hand. The wristband may also enable the user to provide input to the artificial reality system via certain actions and/or gestures.

To properly implement such features, an artificial reality system may attempt to determine a position (e.g., an orientation and/or alignment) of a wearable device on a user's body. For example, knowledge of the exact location of a wristband on a user's wrist may enable an artificial reality system to detect and/or identify movements of specific parts of the user's wrist or hand. Unfortunately, determining the position of a wearable device on a user's body has proved challenging and/or impracticable in some traditional artificial reality systems.

As an example, a traditional artificial reality system may only be capable of estimating or approximating the position of a wearable device via imprecise methods, such as analyzing images captured by a camera of a head-mounted display. Without precise knowledge of the current position, orientation, and/or shape of a wearable device, an artificial reality system may fail to provide a believable or enjoyable experience for a user. The instant disclosure, therefore, identifies and addresses a need for additional apparatuses, systems, and methods for determining the position of wearables donned by users of artificial reality systems.

SUMMARY

As will be described in greater detail below, the instant disclosure generally relates to apparatuses, systems, and methods for determining the position of wearables donned by users of artificial reality systems. In some embodiments, an apparatus may include a wearable dimensioned to be donned by a user of an artificial reality system. The apparatus may also include a sensor that is incorporated into the wearable. The sensor may detect physical interactions between the wearable and at least one specific body part of the user. The apparatus may further include at least one processing device communicatively coupled to the sensor. The processing device may determine, based at least in part on one or more physical interactions between the wearable and the specific body part of the user, a change in a position of the wearable relative to the specific body part of the user.

In some examples, the specific body part of the user may include and/or represent a body part of the user to which the wearable is attached. In such examples, the sensor may detect deformations in the wearable due to movement of the body part of the user to which the wearable is attached. Additionally in such examples, the processing device may determine the change in the position of the wearable by deducing a current shape of the wearable based at least in part on one or more deformations of the wearable detected by the sensor. In one embodiment, the sensor may include and/or represent a strain gauge whose electrical resistance is commensurate with an amount of force applied to the strain gauge.

In some examples, the wearable may additionally include a plurality of visual tracking aids that enable the artificial reality system to track a location of the wearable within a physical environment surrounding the user. In such examples, the processing device may determine the change in the position of the wearable by detecting a change in a position of a visual tracking aid relative to at least one additional tracking aid. Additionally in these examples, the processing device may pass the change in the position of the visual tracking aid relative to the additional visual tracking aid to the artificial reality system to facilitate tracking the location of the wearable within the physical environment surrounding the user.

In some examples, the specific body part of the user may include and/or represent an internal structure of the user. In such examples, the sensor may determine a distance between the internal structure of the user and the sensor. Additionally in such examples, the processing device may determine the change in the position of the wearable by detecting a change in the distance between the internal structure of the user and the sensor. In one embodiment, the sensor may identify a location of the internal structure of the user by scanning an internal region of the user with near-infrared (NIR) signals.

In some examples, the specific body part of the user may include and/or represent a finger of the user. In such examples, the sensor may include and/or represent an interface of the wearable that is designed to be touched by the finger of the user. Additionally in such examples, the processing device may detect when the finger of the user touches the interface based at least in part on images captured by a camera incorporated into the artificial reality system. The processing device may then determine the change in the position of the wearable by (1) identifying, while the finger of the user is touching the interface, a current position of the finger of the user relative to a body part of the user to which the wearable is attached and then (2) determining, based at least in part on the current position of the finger of the user relative to the body part to which the wearable is attached, a current alignment of the wearable relative to the body part of the user to which the wearable is attached.

In some examples, the processing device may pass, to the artificial reality system, the change in the position of the wearable relative to the specific body part of the user to enable the artificial reality system to modify at least one virtual component of the artificial reality system. For example, the artificial reality system may detect at least one action performed by the user based at least in part on a current position of the wearable relative to the specific body part of the user. The artificial reality system may then modify the virtual component to account for the action performed by the user.

A corresponding system may include a wearable dimensioned to be donned by a user of an artificial reality system. The system may also include a housing that is attached to the wearable. This housing may facilitate transmission of a plurality of types of communication signals. The system may further include a sensor that is secured within the housing. The sensor may detect physical interactions between the wearable and at least one specific body part of the user based at least in part on one or more signals transmitted via the housing. In addition, the system may include at least one processing device communicatively coupled to the sensor. The processing device may determine, based at least in part on one or more physical interactions between the wearable and the specific body part of the user, a change in a position of the wearable relative to the specific body part of the user.

In some examples, the artificial reality system may track a location of the wearable within a physical environment surrounding the user. In such examples, the housing may secure a plurality of visual tracking aids that facilitate tracking the location of the wearable. In one embodiment, the plurality of visual tracking aids may include and/or represent one or more light-emitting devices. In this embodiment, the housing may transmit light emitted by the light-emitting devices such that the light is received by a camera incorporated into the artificial reality system.

In some examples, the sensor may include and/or represent one or more NIR devices (such as an NIR emitter and/or an NIR detector). In such examples, the housing may transmit NIR signals generated by the NIR devices.

In some examples, the housing may secure at least on additional sensor that detects an electrical response generated by an accelerometer incorporated into the wearable. In such examples, the processing may determine, based at least in part on the electrical response detected by the sensor, that the user has made a specific gesture with at least one body part.

A corresponding method may include (1) detecting, by a sensor incorporated into a wearable dimensioned to be donned by a user of an artificial reality system, physical interactions between the wearable and at least one specific body part of the user, (2) determining, based at least in part on one or more physical interactions between the wearable and the specific body part of the user, a change in a position of the wearable relative to the specific body part of the user, and then (3) generating at least one input command for the artificial reality system that accounts for the change in the position of the wearable.

In some examples, the virtual component of the artificial reality system may include and/or represent an image displayed to the user by the artificial reality system. In such examples, modifying the virtual component of the artificial reality system to account for the change in the position of the wearable may include adjusting a location of the image as perceived by the user.

Various advantages of the present application will be apparent in light of the descriptions below.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures and description.

Figure 1:
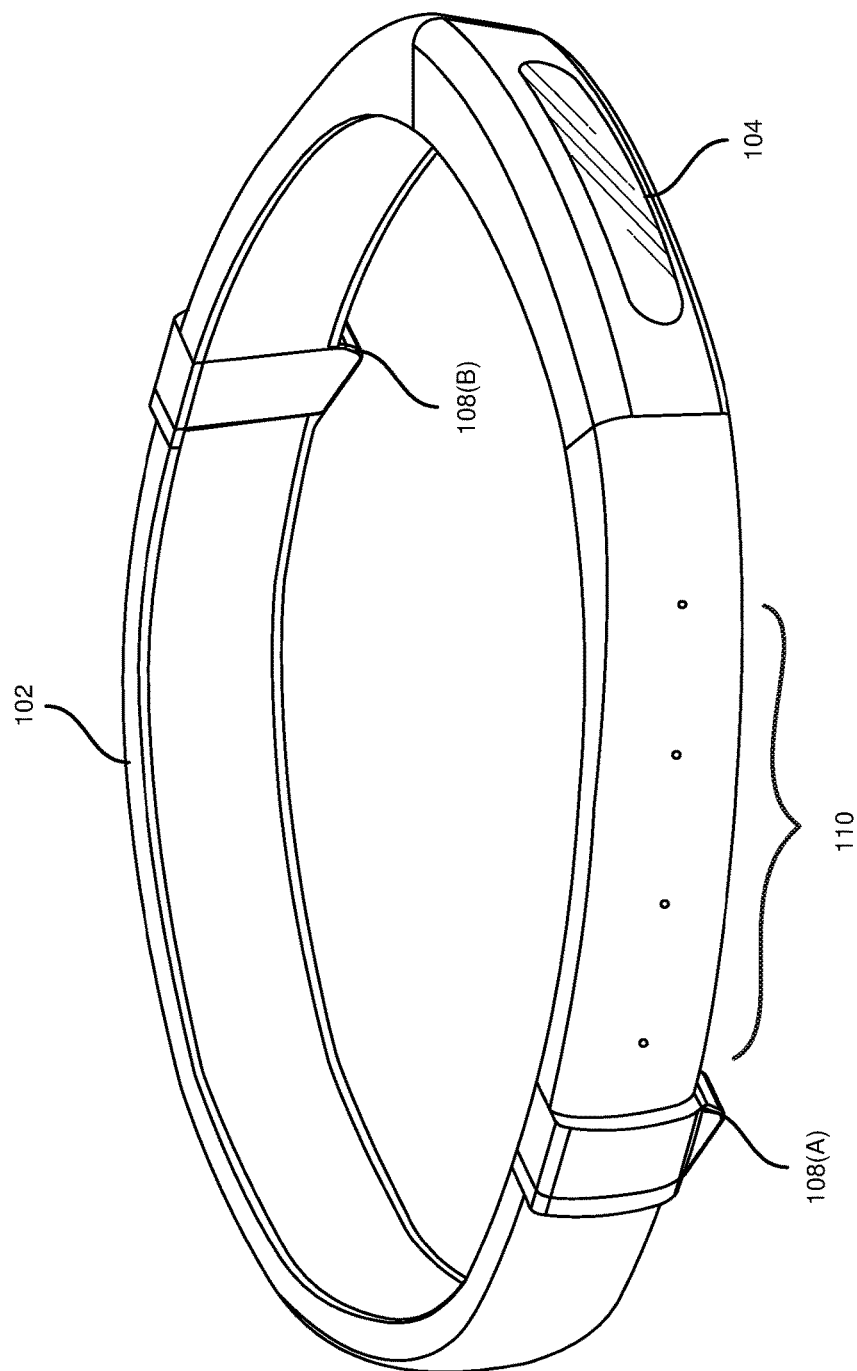
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for determining the position of wearables donned by users of artificial reality systems. As will be explained in greater detail below, embodiments of the present disclosure may determine the precise position, orientation, and/or shape of an artificial reality device on a user's body. For example, one or more sensors on a wristband donned by a user of an artificial reality system may detect when the wristband has shifted, been adjusted, or otherwise moved. In some embodiments, detecting and quantifying such movements may be referred to as "coordinate frame reconciliation."

By determining the position of a wearable device donned by a user, an artificial reality system may ensure that virtual content (such as images and haptic feedback) provided via the wearable device is perceived in the correct location by the user. In addition, determining the position of the device may enable the artificial reality system to accurately sense certain actions or movements of the user (e.g., by facilitating the collection and analysis of tomographic data used to detect hand gestures made by the user). Accordingly, by periodically determining the position of the wearable device with respect to the user's body, the disclosed apparatuses, systems, and methods may provide a more immersive and realistic artificial reality experience for the user.

Figure 2:
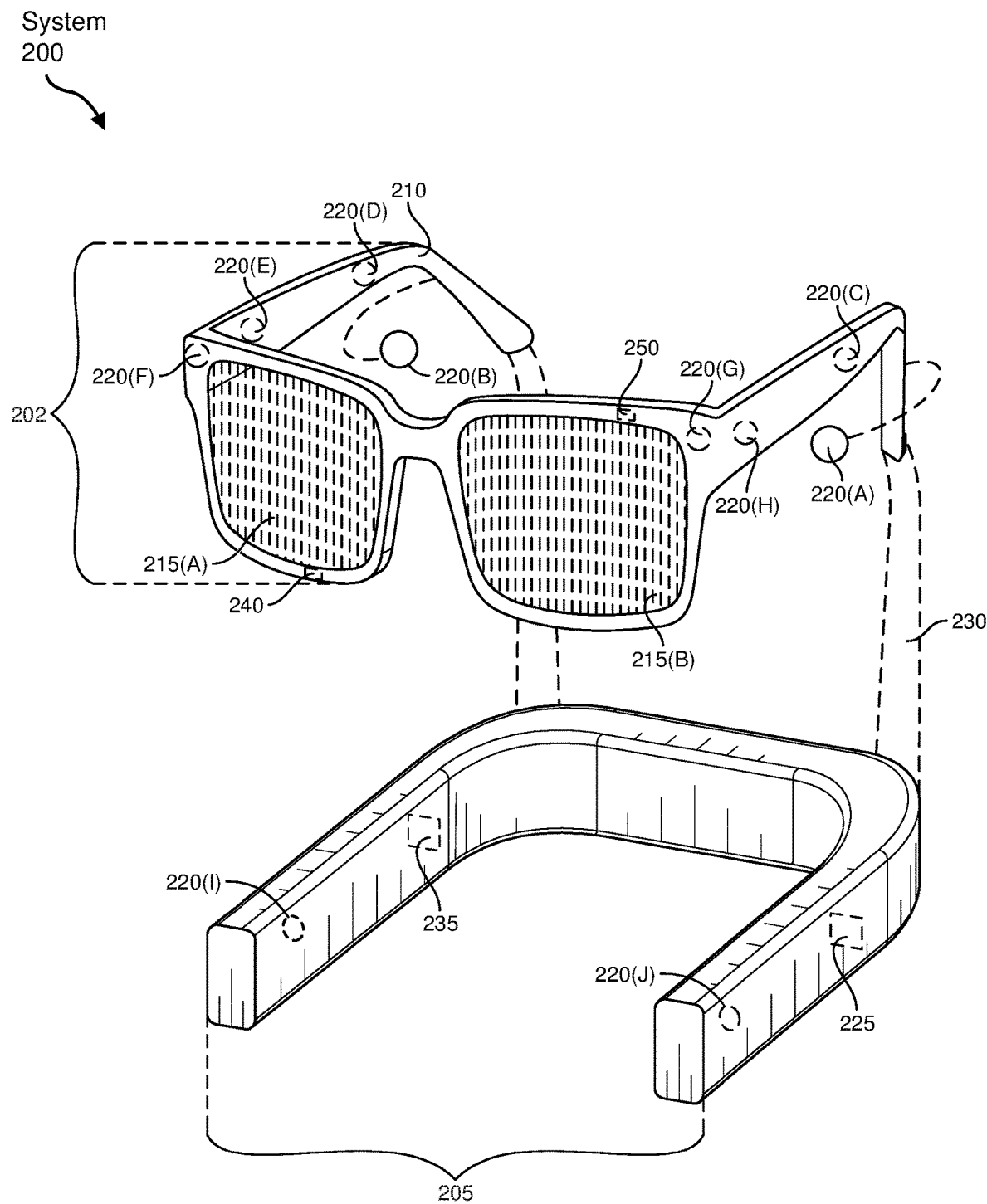
FIG. 2 illustrates an embodiment of an augmented reality headset and a corresponding neckband.
Figure 3:
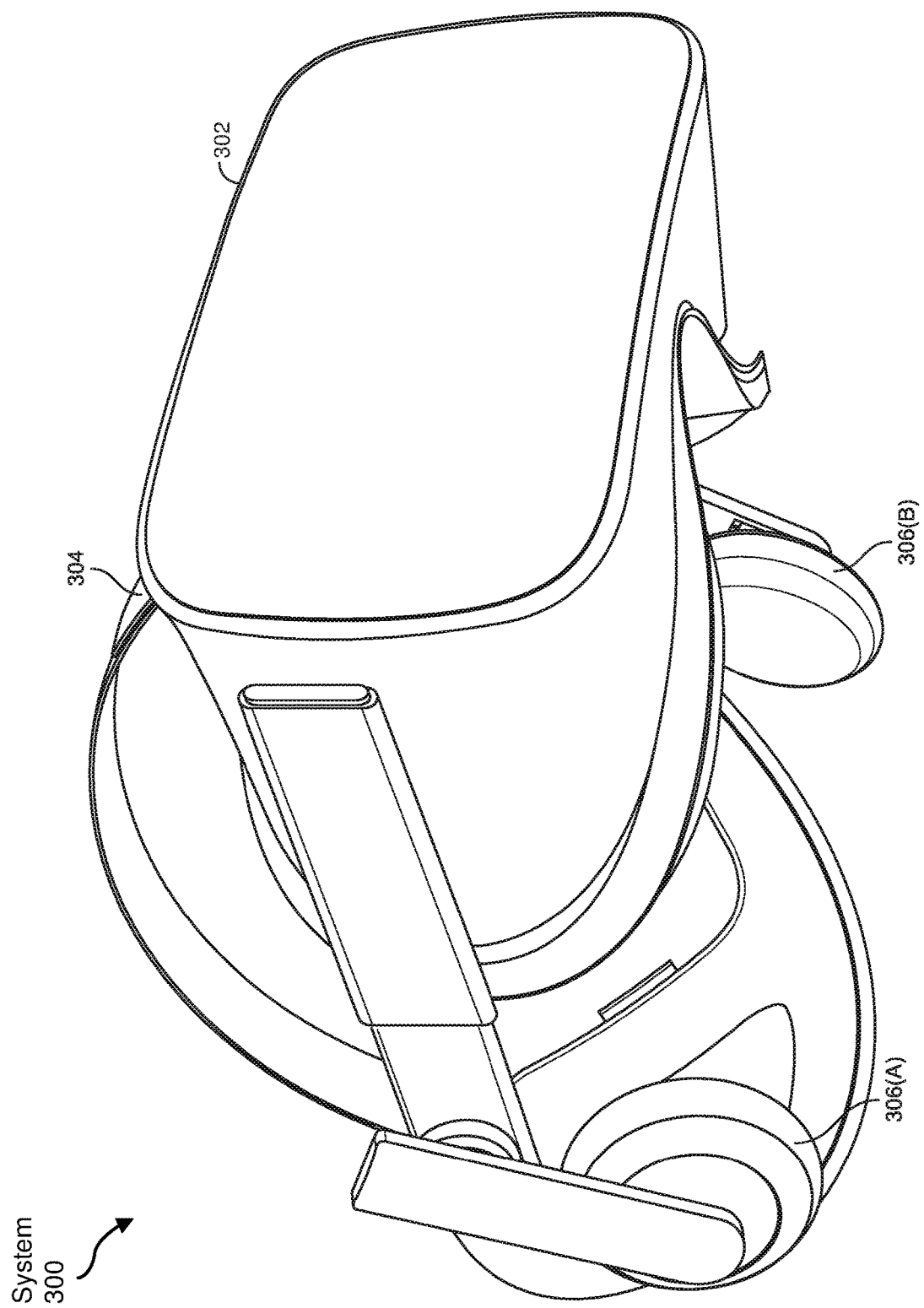
FIG. 3 illustrates an embodiment of a virtual reality headset.

The following will provide, with reference to FIGS. 1-3, detailed descriptions of various types of exemplary artificial reality devices that may facilitate and/or contribute to a user's artificial reality experience. Detailed descriptions of exemplary apparatuses that facilitate determining the position of wearables donned by users of artificial reality systems and/or implementations of these apparatuses will be provided in connection with FIGS. 4-9. In addition, the discussion corresponding to FIG. 10 will provide detailed descriptions of an exemplary method for determining the position of wearables donned by users of artificial reality systems.

Embodiments of the instant disclosure may include or be implemented in conjunction with various types of artificial reality systems. Artificial reality may constitute a form of reality that has been altered by virtual objects for presentation to a user. Such artificial reality may include and/or represent VR, AR, MR, hybrid reality, or some combination and/or variation of one or more of the same. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, AR system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by a controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. Connectors 230 may be wired or wireless connectors and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to AR system 200. In the embodiment of FIG. 2, neckband 205 may include two acoustic sensors (e.g., 220(1) and 220(J)) that are part of the microphone array (or potentially form their own microphone subarray). Neckband 205 may also include a controller 225 and a power source 235.

Acoustic sensors 220(1) and 220(J) of neckband 205 may be configured to detect sound and convert the detected sound into an electronic format (analog or digital). In the embodiment of FIG. 2, acoustic sensors 220(1) and 220(J) may be positioned on neckband 205, thereby increasing the distance between neckband acoustic sensors 220(1) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a direction of arrival (DOA) estimation to estimate a direction from which the detected sound arrived at the microphone array. As the microphone array detects sounds, controller 225 may populate an audio data set with the information. In embodiments in which AR system 200 includes an IMU, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to a user.

Power source 235 in neckband 205 may provide power to eyewear device 202 and/or to neckband 205. Power source 235 may include, without limitation, lithium-ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG.

3, front rigid body 302 may include one or more electronic elements, including one or more electronic displays, one or more IMUs, one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 100, 200, and 300 of FIGS. 1-3, respectively) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

When the user is wearing an AR or VR device (such as a wristband, neckband, or headset), it may be desirable to determine a position of the wearable device. In some embodiments, the term "position of a wearable" may refer to the specific location of the wearable on a user's body. For example, the position of a wearable may refer to an alignment and/or orientation between the wearable and the portion of the user's body to which the wearable is attached. Additionally or alternatively, the position of a wearable may refer to a location of the wearable within the physical environment surrounding the user. In addition, a "change in the position of a wearable" may refer to any horizontal, vertical, and/or rotational movement of the wearable. The position of a wearable may change due to a variety of reasons, such as adjustments purposefully carried out by a user or unintentional shifts while the user is interacting with an artificial reality system.

Many features of an artificial reality system may be improved and/or facilitated based on knowledge of the position of a wearable. For example, knowing exactly where a wristband is located on a user's wrist may enable an artificial reality system to provide projected images or haptic feedback in a location that aligns with virtual content currently presented to the user via a head-mounted display. In addition, determining the position of a wearable may facilitate detecting certain movements, gestures, and other actions performed by a user. For example, some methods of detecting a user's hand gestures may involve sending electrical and/or acoustic signals through the user's body via a wristband. By determining the position of the wristband on the user's wrist, an artificial reality system may more accurately identify specific parts of the user's body that have interacted with the electrical and/or acoustic signals.

Figure 4:
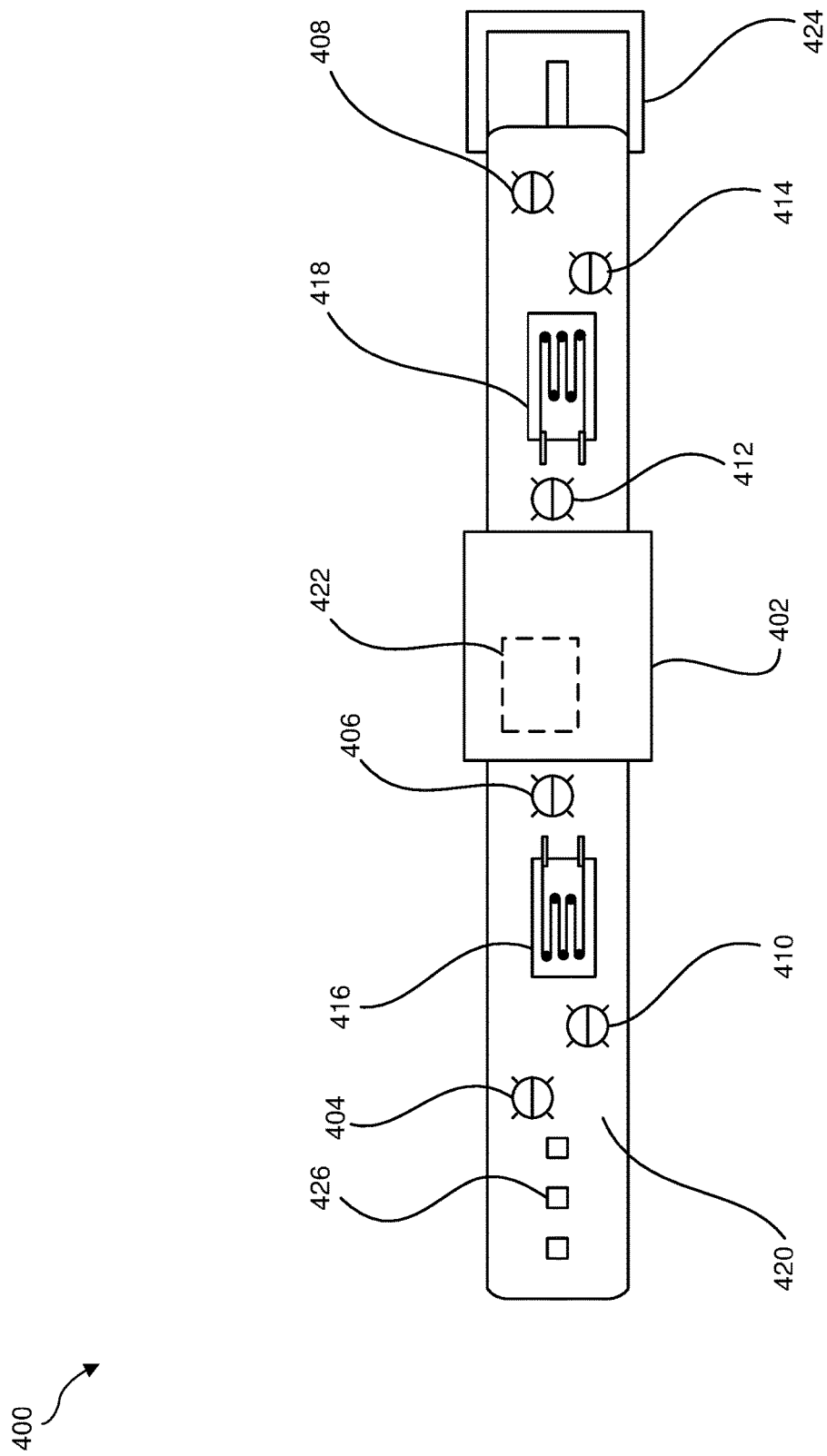
FIG. 4 illustrates an exemplary wearable that facilitates determining the position of the wearable on users of artificial reality systems.

FIG. 4 is an illustration of an exemplary wearable 400 that may be donned by a user of an artificial reality system. In some embodiments, the term "wearable" may refer to any type or form of computing device that is worn by a user as part of an article of clothing, an accessory, and/or an implant. In one example, wearable 400 may be dimensioned to be donned and/or worn by a user of an artificial reality system. For example, the user may fasten wearable 400 to his or her wrist via a wristband 420.

Wristband 420 may include and/or represent a strap designed and/or dimensioned to at least partially encompass the wrist of a user of an artificial reality system. Wristband 420 may include and/or contain a variety of different materials. Examples of such materials include, without limitation, cottons, polyesters, nylons, elastics, plastics, neoprene, rubbers, metals, combinations or variations of one or more of the same, and/or any other suitable materials. Wristband 420 may be defined and/or formed in a variety of shapes and/or sizes with the aim of securing to the wrist of a user of an artificial reality system. In some examples, wristband 420 may be adjustable to provide a one-size-fits-most feature.

As illustrated in FIG. 4, wearable 400 may include a fastener 424 that facilitates securing wristband 420 to the wrist of the user. In one example, fastener 424 may interface with a receptacle 426 of wristband 420. In this example, when wristband 420 encompasses the wrist of the user and fastener 424 is secured to receptacle 426, the combination of fastener 424 and receptacle 426 may effectively attach and/or hold wristband 420 in place on the wrist of the user. Although fastener 424 is illustrated as a specific embodiment in FIG. 4, various other embodiments of fasteners may accomplish the same objective and thus be substituted for fastener 424. Examples of such fasteners include, without limitation, members, pegs, pins, clamps, clips, latches, snaps, zippers, rivets, hook and loop combinations, combinations or variations of one or more of the same, and/or any other suitable fasteners.

Wearable 400 may also include a housing 402. Housing 402 generally represents any type or form of enclosure, structure, or chassis that secures and/or contains one or more electrical and/or mechanical elements. For example, housing 402 may include one or more physical processors, memory devices, sensors, user interfaces, and/or power supplies. In some examples, housing 402 may secure all or a portion of the sensors incorporated into wearable 400.

As shown in FIG. 4, housing 402 may contain a processing device 422. Processing device 422 may include and/or represent a hardware-implemented processing device capable of interpreting and/or executing computer-readable instructions. In one example, processing device 422 may determine the position of wearable 400 based at least in part on data collected by one or more sensors incorporated into wearable 400.

In some embodiments, processing device 422 may communicate with one or more remote devices, such as a head-mounted display that is worn on a user's face and/or presents visual content to the user. In one example, instead of being incorporated into wearable 400, processing device 422 may be incorporated into the head-mounted display that is worn by the user. Continuing with this example, processing device 422 incorporated into the head-mounted display may be communicatively coupled to the components of wearable 400 via a wireless or wired communication interface.

In one embodiment, wearable 400 may include one or more components that facilitate determining a position (e.g., an alignment and/or orientation) of wearable 400 with respect to the part of the user's body to which wearable 400 is attached. Additionally or alternatively, wearable 400 may include one or more components that facilitate determining a location of wearable 400 with respect to a physical environment surrounding the user. For example, wearable 400 may include one or more components that enable a camera incorporated into a head-mounted display to track changes in the position of wearable 400 as the user moves.

Specifically, in the example of FIG. 4, wearable 400 may include one or more light-emitting devices, such as light-emitting devices 404, 406, 408, 410, 412, and 414. Light-emitting devices 404, 406, 408, 410, 412, and 414 may generate and emit light with any suitable wavelength and/or within any suitable spectrum (such as visible light, ultraviolet (UV) light, NIR light, etc.). In one embodiment, each of light-emitting devices 404, 406, 408, 410, 412, and 414 may represent and/or include one or more light-emitting diodes (LEDs).

In the example of FIG. 4, light-emitting devices 404, 406, 408, 410, 412, and 414 may be distributed along the top surface of wristband 420 (e.g., the surface not in contact with the user's body). Light-emitting devices 404, 406, 408, 410, 412, and 414 may be distributed in any suitable manner or configuration. For example, the light-emitting devices may be evenly spaced along wristband 420. Alternatively, the light-emitting devices may be clustered and/or grouped. In general, the light-emitting devices of wearable 400 may be distributed along wristband 420 in any manner such that the camera of the head-mounted display worn by the user may detect light emitted by one or more of the light-emitting devices in order to track changes in the position of wearable 400. The head-mounted display may perform any type or form of computer vision tracking (such as so-called constellation tracking) for wearable 400 based on the light emitted by light-emitting devices 404, 406, 408, 410, 412, and 414.

In one embodiment, wristband 420 may be rigid. For example, wristband 420 may be composed of a non-flexible material (such as metal or hard plastic). In this example, the distance (e.g., the spacing and/or pitch) between each of light-emitting devices 404, 406, 408, 410, 412, and 414 may remain constant even as the user moves. Accordingly, the head-mounted display may track the position of wearable 400 using computer vision tracking techniques designed and/or optimized for rigid bodies.

In other embodiments, wristband 420 may be flexible. For example, all or a portion of wristband 420 may be composed of a material (such as rubber or fabric) that is capable of bending and/or deforming. In this way, wristband 420 may be comfortably and securely fastened to users with a variety of wrist sizes. However, a flexible wristband may allow for changes in the distance between one or more components of the wristband. For example, in the event that a portion of wristband 420 bends, twists, stretches, or otherwise deforms, the physical distance between two more light-emitting devices may change.

In one embodiment, wearable 400 may include one or more components that facilitate detecting changes in the distance between light-emitting devices 404, 406, 408, 410, 412, and 414. For example, wristband 420 may include one or more strain gauges, such as strain gauges 416 and 418. In some embodiments, the term "strain gauge" may refer to any type or form of device whose electrical resistance is commensurate with an amount of strain or force on the device. For example, a strain gauge may represent and/or include a conductive material (such as metal) that changes shape in response to a sufficient amount of force or pressure. Because the electrical resistance of a conductive material may depend on and/or change based on its geometry, processing device 422 may determine that wristband 420 has changed shape at least in part by detecting a change in the electrical resistance of strain gauges 416 and/or 418.

As an example, processing device 422 may determine that the material of wristband 420 has twisted, bent, and/or stretched (e.g., due to a gesture or other movement of the user's wrist) based at least in part on detecting an increase in the electrical resistance of strain gauge 416. In this example, processing device 422 may determine that wristband 420 has returned to its original shape based at least in part on detecting a corresponding decrease in the electrical resistance of strain gauge 416. Accordingly, processing device 422 may determine, deduce, and/or calculate an overall shape and/or position of all or a portion of wristband 420 by monitoring the electrical resistance of the strain gauges incorporated into wristband 420. Wearable 400 may include any additional or alternative sensors capable of and/or designed to detect deformations and/or changes in the shape or position of wearable 400.

In response to detecting a change in the shape or position of wearable 400, processing device 422 may generate an input command for the artificial reality system. In some examples, this input command may facilitate modifying at least one virtual component of the artificial reality system to account for the change. Processing device 422 may facilitate such modifications in a variety of different ways and contexts. For example, processing device 422 may send a message to the head-mounted display that is worn by the user. Examples of this message include, without limitation, commands, computer-readable instructions, information and/or data indicative of deformations of wearable 400, combinations or variations of one or more of the same, and/or any other suitable message.

In some examples, the head-mounted display may then modify a computer vision tracking algorithm to account for the deformations in wearable 400 detected by processing device 422. For example, the head-mounted display may determine, based on input from processing device 422, that a light-emitting device on wristband 420 is in a different position than the expected position of the light-emitting device (e.g., the position in which the light-emitting device would be located if wristband 420 was a rigid body). Specifically, the head-mounted display may determine that the light-emitting device is at an angle and/or offset relative to its expected position.

Thus, the head-mounted display may determine a precise position of all or a portion of wearable 400 within the physical environment surrounding the user. Based on determining this position, the head-mounted display may generate and/or modify certain graphics or image frames for presentation to the user. These graphics or image frames may take into account that wearable 400 (and therefore the portion of the user's body attached to wearable 400, such as the user's wrist) is currently located in a certain position. In some examples, these updated graphics or image frames may more fully immerse the user in their virtual experience.

In other examples, processing device 422 may store the input command in connection with the artificial reality system without necessarily modifying a virtual component of the artificial reality system. For example, processing device 422 may store a tag and/or metadata for the artificial reality system that describes and/or records a change in the position of wearable 400. In this example, the tag and/or metadata may not necessarily modify any virtual components of the artificial reality system.

In some embodiments, processing device 422 and/or the head-mounted display may supplement and/or replace a computer vision tracking algorithm with one or more additional techniques for determining the position of wearable 400. For example, as the user interacts with virtual content provided by wearable 400 and/or the head-mounted display, wearable 400 may periodically move out of and then back into the field of vision of the camera incorporated into the head-mounted display. While wearable 400 is out of the field of vision of the camera, processing device 422 may calculate, deduce, and/or estimate the position of wearable 400 within the physical environment surrounding the user via any suitable technique that is not dependent on computer vision tracking. For example, processing device 422 may detect changes in the position of wearable 400 based on NIR tomography data about the body part of the user to which wearable 400 is attached, acoustic sensing of objects near wearable 400, changes in the acceleration of wearable 400, changes in electric and/or magnetic fields surrounding wearable 400, combinations of one or more of the same, variations of one or more of the same, and/or any additional technique.

After determining that wearable 400 has returned to the field of vision of the camera incorporated into the head-mounted display, processing device 422 and/or the head-mounted display may resume tracking the position of wearable 400 based at least in part on a computer vision tracking algorithm. In some examples, processing device 422 may also calibrate, optimize, and/or update one or more other methods (such as analyzing NIR tomography data) for tracking the position of wearable 400 based on the current position of wearable 400 (e.g., the most recent position determined based on a computer vision tracking algorithm). Additionally or alternatively, processing device 422 may determine the position of wearable 400 based on both computer vision tracking algorithms and additional techniques. For example, processing device 422 may implement a Kalman filter or similar method for combining and/or converging data collected from multiple sources over a period of time. In this way, processing device 422 may accurately and efficiently track changes in the position of wearable 400 while wearable 400 is both inside and outside the field of vision of the camera incorporated into the head-mounted display.

In addition to the various components illustrated in FIG. 4, exemplary wearable 400 may include one or more other components that are not illustrated and/or labelled in FIG. 4. For example, wearable 400 may include an inertial measurement unit, a magnetometer, and/or a gyroscope. In some embodiments, processing device 422 may utilize input from such devices to facilitate and/or improve tracking the position of wearable 400 and/or the user's hand. Wearable 400 may also include and/or incorporate batteries, electronic assemblies, communication interfaces or devices, and/or fasteners. An apparatus for determining the position of wearables donned by users of artificial reality systems may include and/or represent all or a portion of wearable 400 in FIG. 4. Accordingly, wearable 400 in FIG. 4 may, on its own, constitute and/or amount to an apparatus or system for determining the position of wearables donned by users of artificial reality systems.

Figure 5:
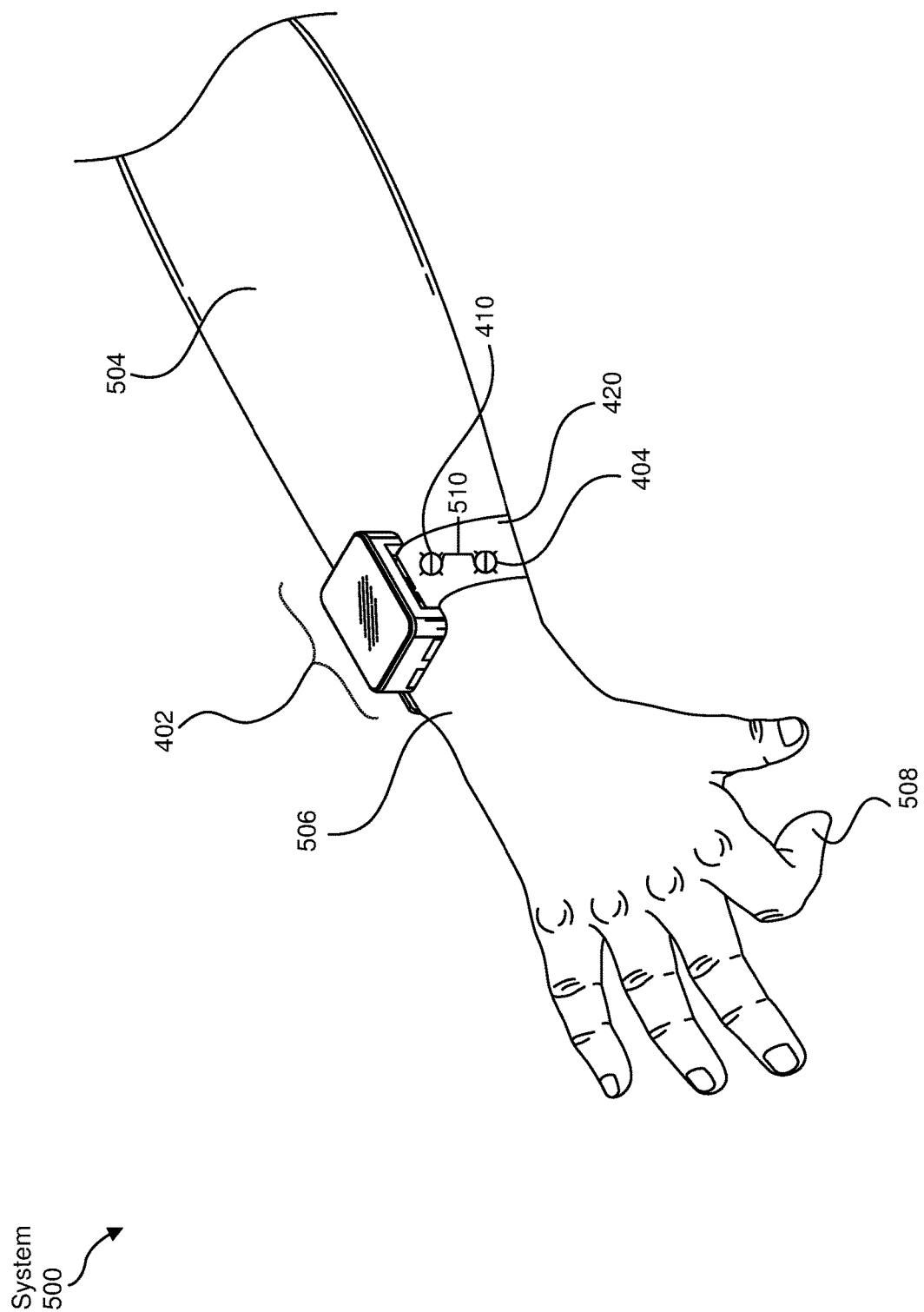
FIG. 5 illustrates an exemplary implementation of the wearable illustrated in FIG. 4.

FIG. 5 illustrates an exemplary implementation 500 that demonstrates wearable 400 secured around a wrist 506 of the user. In this example, light-emitting device 404 and light-emitting device 410 may be separated by a distance 510 at a particular point in time. In one embodiment, distance 510 may correspond to a length of wristband 420 between the two light-emitting devices. In another embodiment, distance 510 may correspond to a distance in three-dimensional space between the two light-emitting devices.

In some examples, distance 510 may change in response to a movement of the user, such as a movement of wrist 506 of the user, a movement of a finger 508 of the user, and/or a movement of an arm 504 of the user. In these examples, processing device 422 may detect such a change based at least in part on input from one or more sensors incorporated into wristband 420, such as strain gauge 416 and/or 418. As discussed in connection with FIG. 4, processing device 422 may pass this detected change to the head-mounted display worn by the user such that the head-mounted display may optimize a computer vision tracking algorithm based on the change.

Figure 6:
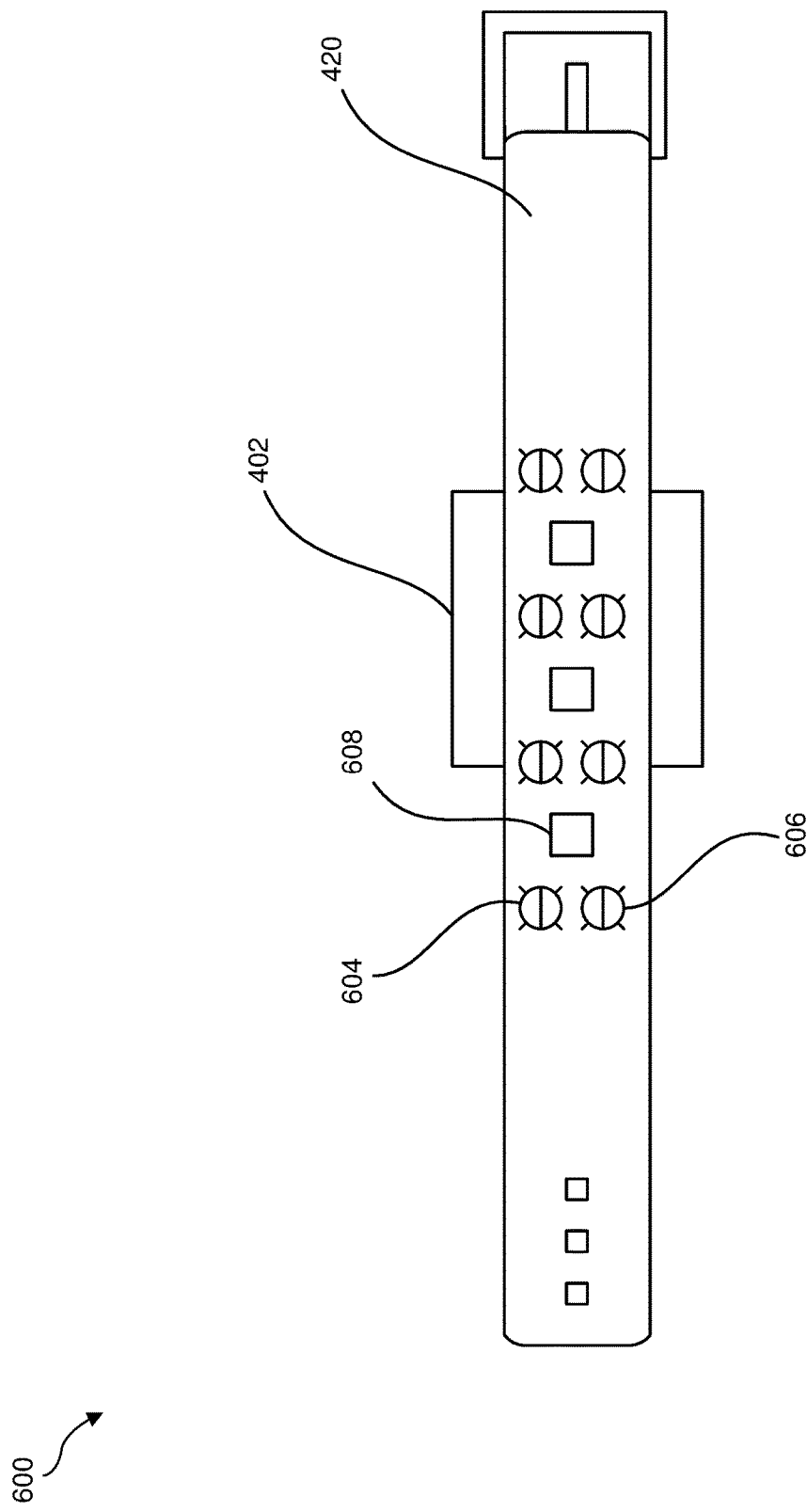
FIG. 6 illustrates an additional exemplary wearable that facilitates determining the position of the wearable on users of artificial reality systems.

FIG. 6 is an illustration of an exemplary wearable 600 that may be donned by a user of an artificial reality system. Similar to wearable 400, wearable 600 may include wristband 420, housing 402, and processing device 422. In the example of FIG. 6, processing device 422 may determine the position of wearable 600 on the user's body based at least in part on the distance between one or more sensors on wearable 600 and one or more internal structures (e.g., bones, arteries, tendons, ligaments, etc.) of the user.

Wearable 600 may include various components designed to and/or capable of determining the location of one or more internal structures of the user. For example, wearable 600 may include one or more light-emitting devices, such as light-emitting devices 604 and 606. Light-emitting devices 604 and 606 generally represent and/or include any type or form of devices that emit light capable of penetrating a certain distance (e.g., several centimeters) into human tissue. For example, light-emitting devices 604 and 606 may include and/or represent NIR spectrometers that emit NIR signals. In the example of FIG. 6, light-emitting devices 604 and 606 may be secured to the bottom of wristband 420 (e.g., the surface of wristband 420 that is in contact with the user).

In one embodiment, each light-emitting device on wearable 600 may emit NIR light with the same wavelength (e.g., 800 nanometers). In other embodiments, the light-emitting devices may emit NIR light with various wavelengths. For example, light-emitting device 604 may emit light with a wavelength of 780 nanometers and light-emitting device 606 may emit light with a wavelength of 850 nanometers. By scanning an internal region of a user with light of varying wavelengths, wearable 600 may more accurately detect different types of internal structures.

Wearable 600 may also include one or more light-detecting sensors, such as light-detecting sensor 608. Light-detecting sensor 608 generally represents and/or includes any type or form of sensor capable of and/or designed to detect light emitted by one or more light-emitting devices after the light has been reflected by an internal structure of the user. For example, light-detecting sensor 608 may represent and/or include a photodetector optimized to detect NIR light.

The light-emitting devices and light-detecting sensors on wearable 600 may be arranged and/or secured in any suitable configuration and/or pattern. Wearable 600 may also include any number of light-emitting devices and/or light-detecting sensors. In one embodiment, the light-emitting devices and light-emitting sensors of wearable 600 may be at least partially secured within housing 402.

In some embodiments, processing device 422 may identify specific internal structures of the user's body based on input from the light-detecting sensors on wearable 600. For example, processing device 422 may detect the presence and/or shape of an internal structure based on determining that a light-detecting sensor in a particular location on wristband 420 received a high amount of reflected light (e.g., compared to other light-detecting sensors). In addition, processing device 422 may determine that an internal structure is a specific type of structure (e.g., a bone rather than an artery) based on factors such as an amount of light reflected by the structure and/or a certain wavelength of light that was reflected by the structure. In one embodiment, the location, shape, and/or type of an internal structure may represent and/or refer to a tomography of the internal structure.

After identifying an internal structure of the user's body, processing device 422 may determine an alignment between the internal structure and wearable 600. For example, processing device 422 may compare the location of one or more light-detecting sensors that detected the internal structure with a location at which the structure is known to be located within the user's body. Additionally or alternatively, processing device 422 may detect a change in the position of wearable 600 by determining that one or more light-detecting sensors that detected the structure at a previous point in time have moved relative to the structure.

Figure 7:
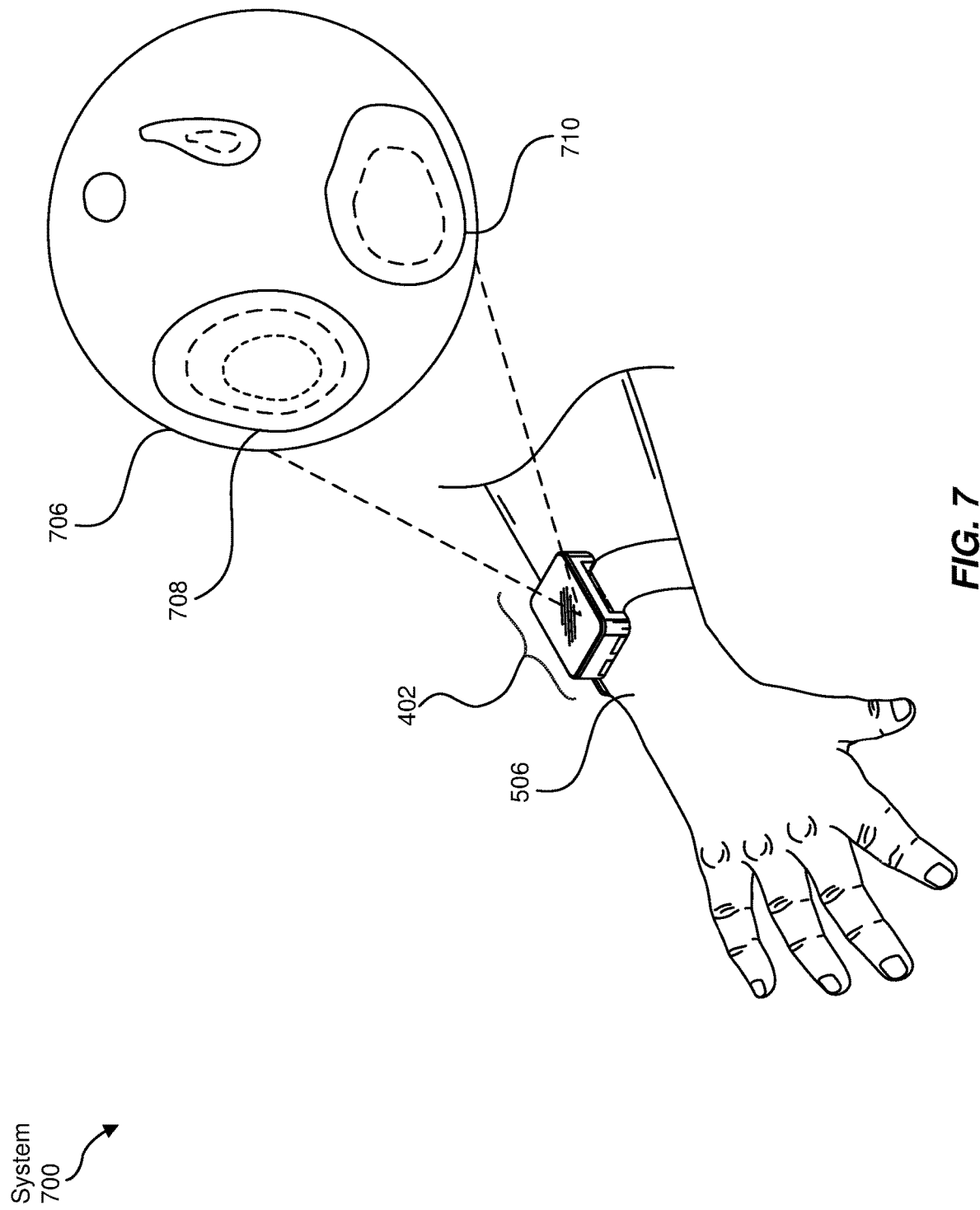
FIG. 7 illustrates an exemplary implementation of the wearable illustrated in FIG. 6.

FIG. 7 illustrates an exemplary implementation 700 that demonstrates wearable 600 on wrist 506 of the user. In implementation 700, processing device 422 may generate a map 706 based on the light detected by the light-detecting sensors on wearable 600. In one embodiment, map 706 may represent and/or correspond to a light map that indicates the relative intensity of light detected by the light-detecting sensors of wearable 600 at a particular point in time. Map 706 shows several representations of internal structures of the user, including a structure representation 708 and a structure representation 710. In some embodiments, processing device 422 may periodically (e.g., every 200 milliseconds, every second, etc.) generate such a light map while the using is interacting with wearable 600.

In some examples, processing device 422 may compare the locations of structure representations 708 and/or 710 within map 706 with the locations of corresponding structure representations within a light map generated at some point prior to the generation of map 706. In the event that the locations of the structure representations do not align, processing device 422 may determine that wearable 600 has shifted, been adjusted, or otherwise moved on wrist 506 of the user. In some embodiments, processing device 422 may determine a precise distance and/or a direction of the movement.

In response to detecting a change in the position of wearable 600, processing device 422 may facilitate modifying at least one virtual component presented to the user via the artificial reality system to account for the change.

Processing device 422 may facilitate such modifications in a variety of different ways and contexts. In one example, processing device 422 may adjust the orientation and/or location of an image that is projected onto the user's body via wearable 600. As another example, processing device 422 may direct a device on wristband 420 that produces haptic feedback to adjust the location at which the haptic feedback is provided to the user.

Additionally or alternatively, processing device 422 may utilize information about the current position of wearable 600 to facilitate detecting specific actions of the user. For example, wearable 600 may include one or more additional sensors (such as accelerometers, inertial measurement units, magnetometers, gyroscopes, acoustic sensors, electromyography sensors, etc.) that detect motions such as touching or releasing an object and/or making a specific hand gesture. Knowledge of the exact position of wearable 600 on the user's wrist may enable processing device 422 to properly detect these motions. As an example, processing device 422 may detect hand gestures of a user based on sending electrical and/or acoustic signals through the user's body. Based on knowledge of the exact position of wearable 600 on the user's wrist, processing device 422 may accurately identify specific parts of the user's body that have interacted with the electrical and/or acoustic signals.

In some examples, processing device 422 may send a message to the head-mounted display worn by the user. This message may include information and/or data indicative of a change in the position of wearable 600 and/or a motion detected based on knowledge of the change in the position of wearable 600. In one embodiment, this message may include and/or represent an input command that does not necessarily modify a virtual component of the artificial reality system. In other embodiments, this message may prompt and/or enable the head-mounted display to modify one or more virtual components presented to the user to account for the change in position and/or the detected motion. For example, the head-mounted display may generate and/or modify certain graphics or image frames for presentation to the user. These graphics or image frames may take into account that wearable 600 has changed position and/or that the user has performed the detected motion. As an example, a certain hand gesture may serve as input to the head-mounted display that the user requests to view a menu of operational settings for the head-mounted display. In this example, the head-mounted display may generate and present a graphic containing the menu in response to receiving information from processing device 422 that indicates the user has performed the certain hand gesture.

Figure 8:
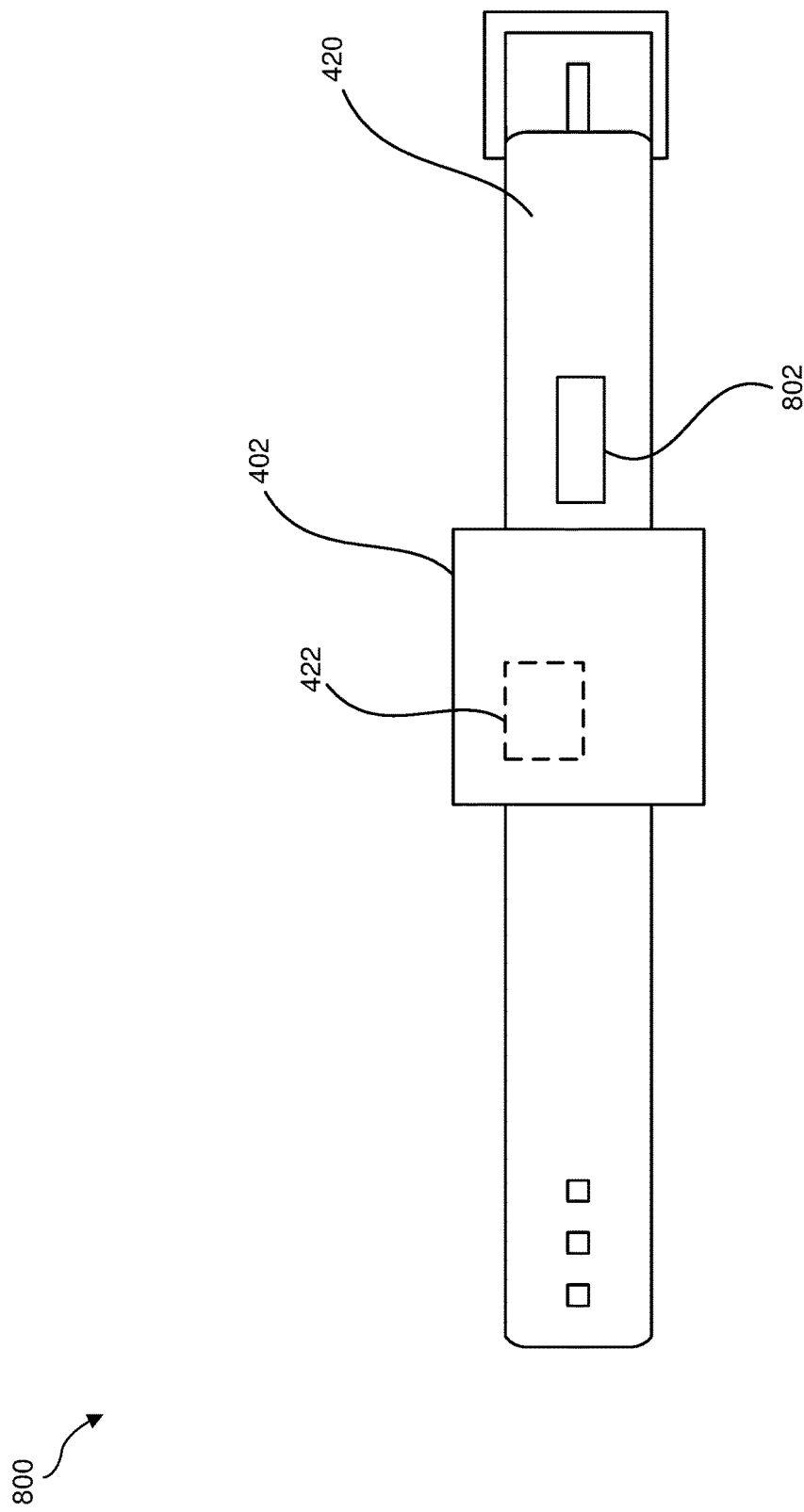
FIG. 8 illustrates an additional exemplary wearable that facilitates determining the position of the wearable on users of artificial reality systems.

FIG. 8 is an illustration of an exemplary wearable 800 that may be donned by a user of an artificial reality system. Similar to wearables 400 and 600, wearable 800 may include wristband 420, housing 402, and processing device 422. In the example of FIG. 8, processing device 422 may determine the position of wearable 600 on the user's body in response to detecting that a part of the user's body (such as the user's finger) has made physical contact with an interface 802 on wearable 800.

Interface 802 may represent any type or form of sensor, surface, region, and/or material that is designed to make physical contact with the user. As shown in FIG. 8, interface 802 may represent and/or correspond to a specific area on the top surface of wristband 420. In another example, interface 802 may be located within and/or on a surface of housing 402. Additionally or alternatively, any portion of wearable 800 may correspond to interface 802. For example, processing device 422 may detect when the user touches any part of wearable 800.

In some examples, interface 802 may represent and/or include a touch-sensitive surface. For example, interface 802 may include and/or represent a sensor capable of detecting physical contact with the user based on the user's capacitance. As another example, interface 802 may include and/or represent a pressure-sensitive surface that detects when the user applies a certain amount of force or pressure to interface 802. Additionally or alternatively, interface 802 may represent a region of wristband 420 that is monitored by a camera incorporated into a head-mounted display worn by the user. In this example, an artificial reality system within the head-mounted display may detect when the user makes physical contact with interface 802 based at least in part on analyzing images captured by the camera.

In some embodiments, processing device 422 and/or a processing device of the head-mounted display may track the location of one or more of the user's fingertips as the user interacts with wearable 800 and/or the head-mounted display. In addition, processing device 422 and/or the processing device of the head-mounted display may track the location of the user's wrist (or any other body part of the user to which wearable 800 is secured). The processing device of the head-mounted display may track the user's fingertip and/or wrist using any suitable computer vision tracking algorithm.

By performing this tracking, the processing device of the head-mounted display may have knowledge of the physical location of both the user's fingertip and the user's wrist when the user's fingertip makes physical contact with interface 802. Because interface 802 may correspond to a specific point or region of wearable 800, the processing device may determine, based at least in part on the location of the user's fingertip, the particular position and/or orientation of wearable 800 on the user's wrist. For example, the processing device may determine that the area of wristband 420 that corresponds to interface 802 is currently positioned on a particular area of the user's wrist.

In some examples, processing device 422 and/or the processing device of the head-mounted display may determine the position of wearable 800 in response to all or a portion of the instances in which the user makes physical contact with interface 802. For example, the user may periodically touch interface 802 to prompt processing device 422 and/or the processing device of the head-mounted display to determine a current alignment between wearable 800 and the user's wrist. In this way, processing device 422 and/or the processing device of the head-mounted display may continue to make fine adjustments and/or optimizations to content presented to the user while the user is immersed in an artificial reality experience.

Figure 9:
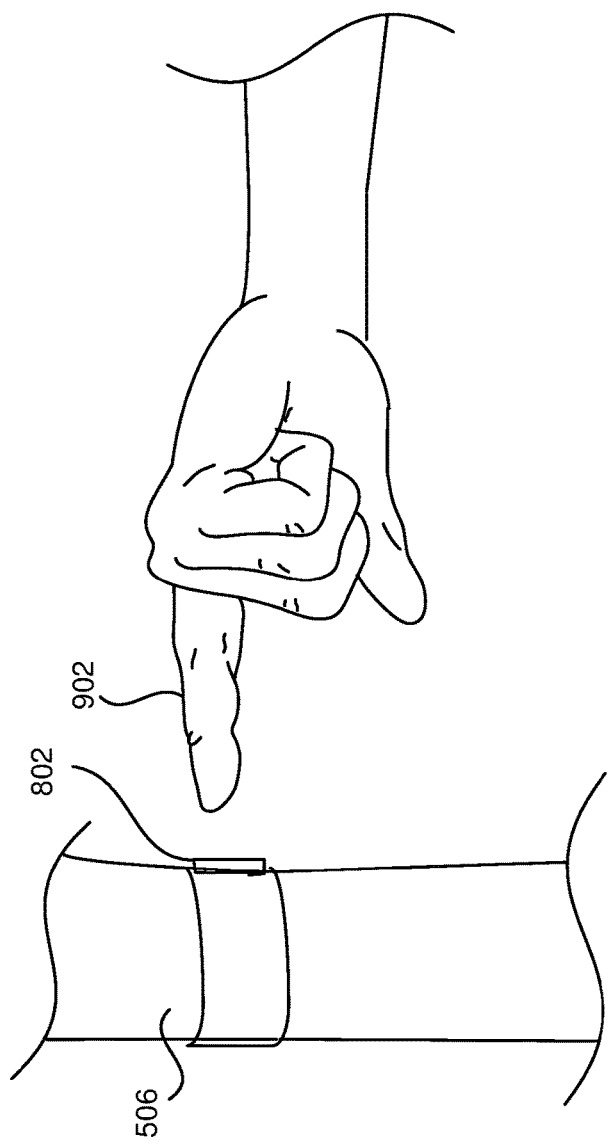
FIG. 9 illustrates an exemplary implementation of the wearable illustrated in FIG. 8.

FIG. 9 illustrates an exemplary implementation 900 that demonstrates wearable 800 on wrist 506 of the user. In this example, a camera incorporated into the head-mounted display worn by the user may facilitate tracking the location of wrist 506, wearable 800, interface 802, and/or a finger 902 (e.g., a finger of the user's other hand). Processing device 422 and/or the processing device of the head-mounted display may detect the moment that finger 902 makes physical contact with interface 802. For example, processing device 422 may detect physical contact between interface 802 and finger 902 based at least in part on one or more touch-sensitive properties of interface 802. Additionally or alternatively, the processing device of the head-mounted display may detect physical contact between interface 802 and finger 902 based at least in part on image frames captured by the camera incorporated into the head-mounted display.

After detecting physical contact between interface 802 and finger 902, the processing device of the head-mounted display may determine the position of wearable 800 on wrist 506 based at least in part on knowledge of the location of wrist 506, finger 902, and/or wearable 800 within the physical environment surrounding the user. For example, the physical processing device may determine that the portion of wristband 420 that corresponds to interface 802 is located on wrist 506 in the same position as finger 902.

In some embodiments, processing device 422 and/or the physical processing device of the head-mounted display may determine that the current position of wearable 800 differs from the most recently detected position of wearable 800. For example, processing device 422 and/or the processing device of the head-mounted display may detect a rotational and/or positional shift of wearable 800 based on a previous alignment between wearable 800 and wrist 506.

Processing device 422 and/or the processing device of the head-mounted display may perform any suitable action (such as the actions discussed in connection with FIG. 7) to account for a change in the position of wearable 800. For example, processing device 422 may generate an input command for the artificial reality system that describes and/or records the change. This input command may not necessarily modify any virtual components of the artificial reality system. Additionally or alternatively, processing device 422 may adjust the location of an image that is projected onto the user's body via wearable 800 and/or adjust the location at which haptic feedback is provided to the user via wearable 800. In another embodiment, processing device 422 may detect a certain motion performed by the user based at least in part on the current position of wearable 800. In this example, the processing device of the head-mounted display may modify certain graphics or image frames presented to the user in order to account for the certain motion.

The wearables disclosed herein may incorporate and/or include any number and/or type of sensors designed to detect changes in the position of the wearables. For example, a wearable may include all or a portion of the sensors and additional elements incorporated into wearable 400, wearable, 600, and wearable 800. In one embodiment, a wearable may include each of the light-emitting devices and strain gauges of wearable 400, the light-emitting devices and light-detecting sensors of wearable 600, and the interface of wearable 800. In other embodiments, a wearable may include a portion of those sensors and elements.

Incorporating multiple types of sensors into a wearable may enable an artificial reality system to more accurately and/or quickly detect changes in the position of the wearable. For example, the artificial reality system may combine and/or average the output of multiple methods for determining the position of a wearable in order to more precisely calculate a change in the alignment, orientation, and/or shape of the wearable. However, in other examples, an artificial reality system may implement only a single or limited number of methods to determine the position of the wearable in order to reduce the energy, bandwidth, computational resources, and/or memory consumed by the wearable.

The sensors and additional elements incorporated into a wearable may be attached to the wearable in a variety of ways. For example, as shown in FIGS. 5-8, sensors and other elements may be secured to both the top surface of a wearable and the bottom surface of the wearable. In addition, a component may be secured within (e.g., inside) the wearable.

In some examples, one or more sensors and/or other elements may be secured within a housing on the wearable, such as housing 402. In one embodiment, a housing of a wearable may be designed to facilitate and/or optimize the operation of one or more components of the wearable. For example, a housing that secures light-emitting devices (such as the light-emitting devices of wearables 400 and 600) may be composed of a material that facilitates transmission of the light emitted from the devices. Specifically, the material of the housing may be designed and/or selected to optimize transmission of light with a wavelength that is emitted by the devices.

In some embodiments, a housing may secure additional sensors and/or elements not illustrated in FIGS. 5-8. For example, a wearable may include an accelerometer that facilitates detection of specific gestures made by a user. In this example, a housing on the wearable may facilitate transmission of electrical signals generated by the accelerometer. For example, the housing may be at least partially composed of a conductive material.

The components of a wearable may be secured within any number of suitable housings. For example, a wearable may include one housing that secures optical devices (such as LEDs) and another housing that secures electrical devices (such as accelerometers). In other examples, a housing may secure multiple types of components. For example, a housing may be designed to facilitate and/or optimize the operation of both electrical and optical devices. In one embodiment, such a housing may include both electrodes and optodes.

Figure 10:
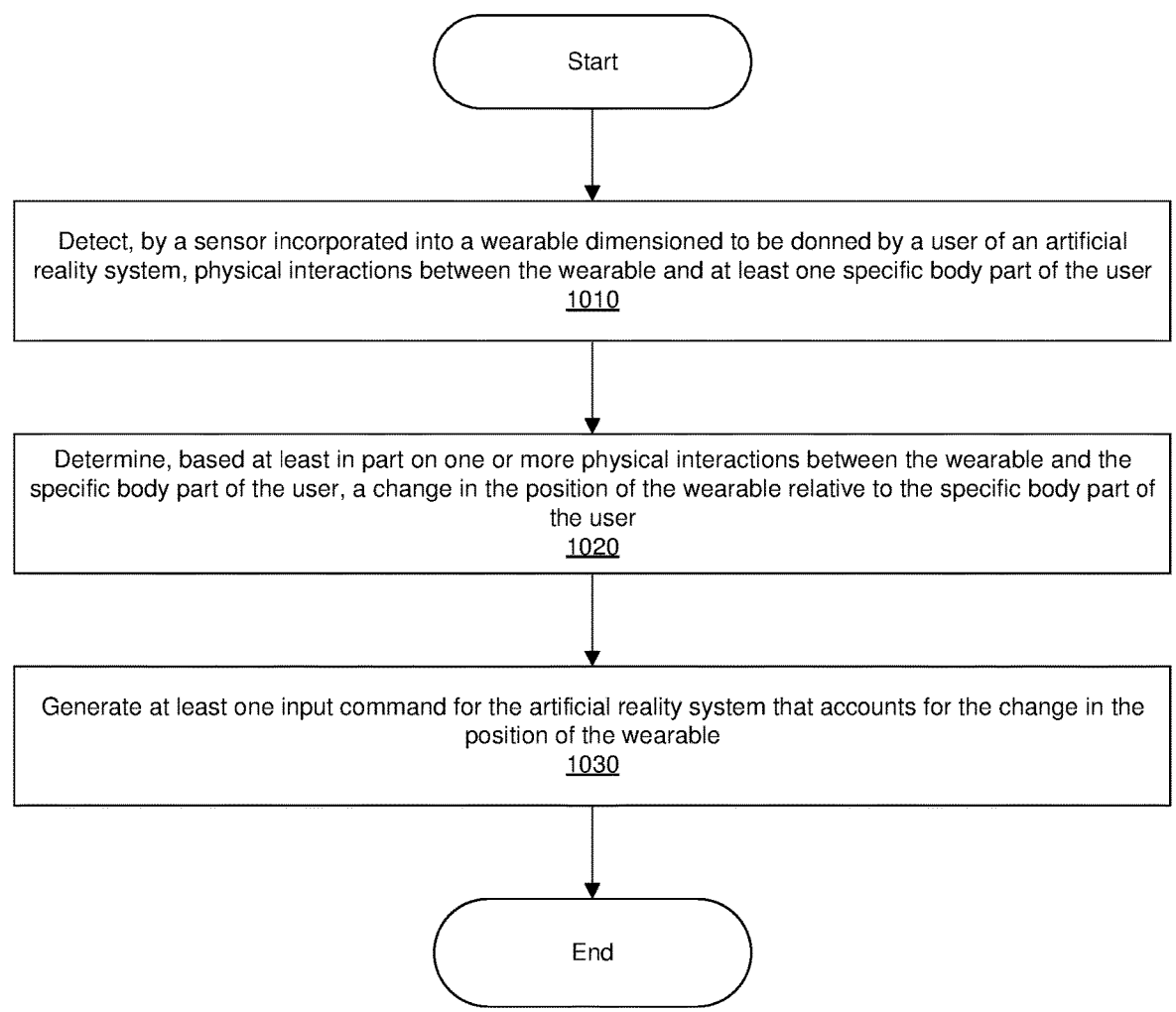
FIG. 10 is a flow diagram of an exemplary method for determining the position of wearables donned by users of artificial reality systems.

FIG. 10 is a flow diagram of an exemplary method 1000 for determining the position of wearables donned by users of artificial reality systems. The steps shown in FIG. 10 may be performed by certain devices incorporated into a wearable of an artificial reality system. Moreover, the steps shown in FIG. 10 may also incorporate and/or involve various sub-steps and/or variations consistent with the descriptions provided above in connection with FIGS. 1-9.

As illustrated in FIG. 10, at step 1010, a sensor incorporated into a wearable dimensioned to be donned by a user of an artificial reality system may detect physical interactions between the wearable and at least one specific body part of the user. For example, strain gauges 416 and 418 may detect strains on one or more portions of wearable 400 due to movement of the body part of the user to which wearable 400 is attached. In another example, light-detecting sensor 608 may detect the presence and/or location of an internal structure of the user. Additionally or alternatively, interface 802 may detect that the user's finger has made contact with interface 802.

At step 1020 in FIG. 10, a processing device may determine, based at least in part on the one or more physical interactions between the wearable and the specific body part of the user, a change in the position of the wearable relative to the specific body part of the user. For example, processing device 422 may determine that a portion of wearable 400 has bent, twisted, and/or stretched based at least in part on the strains detected by strain gauges 416 and/or 418. In another example, processing device 422 may determine that wearable 600 has shifted on the user's body relative to the internal structure detected by light-detecting sensor 608. Additionally or alternatively, processing device 422 may determine the current position of wearable 800 on the user's wrist based at least in part on the location of the user's finger while the user is touching interface 802 and the location of wearable 800 within the physical environment surrounding the user.

At step 1030 in FIG. 10, a processing device may generate at least one input command for the artificial reality system that accounts for the change in position of the wearable. In one example, the processing device may store this input command in connection with the artificial reality system without necessarily modifying any virtual components of the artificial reality system. In other examples, this input command may prompt and/or enable the artificial reality system to modify one or more components of the user's artificial reality experience to account for the change in the position of the wearable. For example, processing device 422 may modify an image projected onto the user's body via the wearable and/or modify a location of haptic feedback provided to the user via the wearable. In another example, processing device 422 and/or a processing device of a head-mounted display worn by the user may modify one or more graphics included in image frames presented to the user via the head-mounted display. Such modifications to the projected image, haptic feedback, and/or graphics may account for the change in the position of the wearable. Additionally or alternatively, processing device 422 may detect a motion (such as a hand gesture, touching or releasing an object, etc.) of the user based at least in part on the change in the position of the wearable. In response to detecting the motion, processing device 422 and/or the processing device of the head-mounted display may adjust virtual and/or artificial content provided to the user to account for the motion.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a wristband dimensioned to be donned proximate to a wrist of a user of an artificial reality system;
    a plurality of components included on the wristband, wherein the components are separated from one another by a certain distance;
    at least one light sensor incorporated into the wristband, wherein the at least one light sensor:
        identifies a location of an internal structure of the user by scanning an internal region of the user via light;
        determines, based at least in part on the internal structure of the user, a first distance between the at least one light sensor and the internal structure of the user at a first point in time; and
        determines, based at least in part on the internal structure of the user, a second distance between the at least one light sensor and the internal structure of the user at a second point in time; and
    at least one processing device communicatively coupled to the at least one light sensor, wherein the processing device detects, based at least in part on the first distance at the first point in time and the second distance at the second point in time, a change in an alignment of the wristband relative to an outer surface of the wrist of the user due at least in part to the wristband having moved in at least one direction relative to the outer surface of the wrist of the user.

2. The apparatus of claim 1, wherein:
    the at least one light sensor or an additional sensor incorporated into the wristband detects deformations in the wristband due to movement of the wrist of the user.

3. The apparatus of claim 2, wherein the additional sensor comprises a strain gauge whose electrical resistance is commensurate with an amount of force applied to the strain gauge.

4. The apparatus of claim 2, wherein the processing device determines the alignment of the wristband in part by deducing a current shape of the wristband based at least in part on the deformations of the wristband detected by the at least one light sensor or the additional sensor.

5. The apparatus of claim 2, wherein:
    the wristband further comprises a plurality of visual tracking aids that enable the artificial reality system to track a location of the wristband within a physical environment surrounding the user; and
    the processing device determines the alignment of the wristband in part by detecting a change in a position of a visual tracking aid relative to at least one additional visual tracking aid.

6. The apparatus of claim 5, wherein the processing device further passes data representative of the position of the visual tracking aid relative to the additional visual tracking aid to the artificial reality system to facilitate tracking the location of the wristband within the physical environment surrounding the user.

7. The apparatus of claim 1, wherein:
    the at least one light sensor comprises an interface of the wristband that is designed to be touched by a finger of the user.

8. The apparatus of claim 7, wherein the processing device further detects when the finger of the user touches the interface based at least in part on images captured by a camera incorporated into the artificial reality system.

9. The apparatus of claim 1, wherein the processing device further passes, to the artificial reality system, data representative of the change in the alignment of the wristband to enable the artificial reality system to modify at least one virtual component of the artificial reality system.

10. The apparatus of claim 9, wherein the artificial reality system modifies the virtual component of the artificial reality system by:
    detecting, based at least in part on the alignment of the wristband relative to the outer surface of the wrist of the user, at least one action performed by the user; and
    modifying the virtual component to account for the action performed by the user.

11. The apparatus of claim 1, wherein:
    the components comprise a plurality of light-emitting devices that are separated from one another by the certain distance; and the processing device determines, based at least in part on the change in the certain distance that separates the light-emitting devices incorporated into the wristband, that the wristband is not located in an expected position relative to the outer surface of the wrist of the user.

12. The apparatus of claim 1, wherein the processing device facilitates modifying at least one component of the artificial reality system to account for the change in the alignment of the wristband relative to the outer surface of the wrist of the user, the component of the artificial reality system comprising at least one of:
  an image projected onto a body part of the user via the wristband, wherein the processing device adjusts a location or orientation of the image as projected onto the body part to account for the change in the alignment of the wristband relative to the outer surface of the wrist of the user; or
  a haptic device incorporated into the wristband, wherein the processing device directs the haptic device to adjust a location at which haptic feedback is provided to the user to account for the change in the alignment of the wristband relative to the outer surface of the wrist of the user.

13. The apparatus of claim 1, wherein the processing device passes data representative of the change in the alignment of the wristband to a head-mounted display to enable the head-mounted display to optimize a computer vision tracking algorithm based at least in part on the change.

14. The apparatus of claim 1, wherein the processing device identifies a specific body part of the user that is interacting with a signal that passes through a body of the user based at least in part on the change in the alignment of the wristband relative to the outer surface of the wrist of the user.

15. A system comprising:
  a wristband dimensioned to be donned proximate to a wrist of a user of an artificial reality system;
  a plurality of components included on the wristband, wherein the components are separated from one another by a certain distance;
  a housing that:
    is attached to the wristband; and
    facilitates transmission of a plurality of types of communication signals;
  at least one light sensor secured within the housing, wherein the at least one light sensor:
    identifies a location of an internal structure of the user by scanning an internal region of the user via light;
    determines, based at least in part on the internal structure of the user, a first distance between the at least one light sensor and the internal structure of the user at a first point in time; and
    determines, based at least in part on the internal structure of the user, a second distance between the at least one light sensor and the internal structure of the user at a second point in time; and
  at least one processing device communicatively coupled to the at least one light sensor, wherein the processing device detects, based at least in part on the first distance at the first point in time and the second distance at the second point in time, a change in an alignment of the wristband relative to an outer surface of the wrist of the user due at least in part to the wristband having moved in at least one direction relative to the outer surface of the wrist of the user.

16. The system of claim 15, wherein:
the artificial reality system tracks a location of the wristband within a physical environment surrounding the user; and
the housing secures a plurality of visual tracking aids that facilitate tracking the location of the wristband.

17. The system of claim 16, wherein:
the plurality of visual tracking aids comprises one or more light-emitting devices; and
the housing transmits light emitted by the light-emitting devices such that the light is received by a camera incorporated into the artificial reality system.

18. The system of claim 15, wherein:
the at least one light sensor comprises one or more near-infrared devices; and
the housing transmits near-infrared signals generated by the near-infrared devices.

19. The system of claim 15, wherein:
the housing secures at least one additional sensor that detects an electrical response generated by an accelerometer incorporated into the wristband; and
the processing device further determines, based at least in part on the electrical response detected by the at least one light sensor, that the user has made a specific gesture with at least one body part.

20. A method comprising:
identifying, by a at least one light sensor incorporated into a wristband dimensioned to be donned proximate to a wrist of a user of an artificial reality system, a location of an internal structure of the user by scanning an internal region of the user via light;
determining, based at least in part on the internal structure of the user, a first distance between the at least one light sensor and the internal structure of the user at a first point in time;
determining, based at least in part on the internal structure of the user, a second distance between the at least one light sensor and the internal structure of the user at a second point in time;
detecting, based at least in part on the first distance at the first point in time and the second distance at the second point time, a change in an alignment of the wristband relative to an outer surface of the wrist of the user due at least in part to the wristband having moved in at least one direction relative to the outer surface of the wrist of the user; and
generating at least one input command for the artificial reality system that accounts for the change in the alignment of the wristband relative to the wrist of the user.

* * * * *